Patented July 23, 1946

2,404,740

UNITED STATES PATENT OFFICE 2,404,740

TREATMENT OF ORGANIC SOLUTIONS OF FORMALDEHYDE-UREA REACTION PRODUCTS

John A. Murray and George H. Metzger, Toledo, Ohio, assignors, by mesne assignments, to Libbey-Owens-Ford Glass Company, a corporation of Ohio No Drawing. Application September 28, 1940, Serial No. 358,935

3 Claims. (Cl. 260—29)

The invention relates to the treatment of organic solutions of formaldehyde-urea reaction products, and more particularly to a method of increasing the viscosity of such a solution without decreasing its compatibility with hydrocarbons.

Organic-soluble formaldehyde-urea reaction products for use in lacquers or enamels are ordinarily produced and sold in the form of a solution in n-butanol diluted with a hydrocarbon such as toluene or xylene. The solutions of the formaldehyde-urea reaction products in n-butanol and a hydrocarbon are used principally for blending with alkyd enamels to produce durable synthetic finishes for automobiles, refrigerators and the like. The purpose of the n-butanol is to keep the formaldehyde-urea reaction product in solution, while the hydrocarbon is used as a dilutent. It is customary to use no more n-butanol than is necessary to keep the reaction product in solution, because the n-butanol is considerably more expensive than the hydrocarbon.

Such a solution is prepared from a formaldehyde-urea reaction product, such as dimethylol urea, that has been formed in aqueous solution. The formaldehyde-urea reaction product is heated under acid conditions in the presence of n-butanol, with or without water or other solvents, until a solution is formed. The solution is then distilled under vacuum until substantially all the water is removed, and the residue from the distillation is diluted with the proper solvents to a suitable concentration for shipment.

The distillation step is necessary because some water is always split off from the formaldehyde-urea reaction product by condensation. If such water were not removed, it would greatly reduce the compatibility of the solution with hydrocarbons. In order to be commercially useful, the solution must be quite compatible with cheap hydrocarbon thinners, such as toluene, xylene or petroleum naphtha, because considerable amounts of such thinners are used in the finishes that are produced by blending the solution of the formaldehyde-urea reaction product with a solution of an alkyd.

In some cases the user desires a solution of relatively high viscosity. For example, a high viscosity may be necessary in a given finish in order to hold a pigment in suspension, and to prevent "flooding" of the pigment, and it may not be possible to attain the desired viscosity by simply reducing the amount of solvents. Since the solutions of relatively high viscosity heretofore produced have been relatively incompatible with hydrocarbons, it has been necessary to sacrifice compatibility with hydrocarbons in order to obtain increased viscosity.

The principal object of the invention is to provide a method of increasing the viscosity of an organic solution of a formaldehyde-urea reaction product without decreasing its compatibility with hydrocarbons. More specific objects and advantages are apparent from the description, which merely discloses and illustrates the invention and is not intended to impose limitations upon the claims.

A typical commercial organic solution (approximately fifty per cent solids) may contain 20 per cent by weight of hydrocarbon, ½ per cent of water, and ½ per cent of an organic acid such as maleic acid, the remainder of the solution consisting of formaldehyde-urea reaction product and n-butanol. A nitrogen analysis of this product shows about 11 per cent by weight of nitrogen, derived from the urea used in preparing the formaldehyde-urea reaction product. This solution is stable in storage for an indefinite period, and does not increase appreciably in viscosity or form a precipitate upon standing.

The present invention is based upon the discovery that when a butanol solution of a formaldehyde-urea reaction product is maintained at an increased concentration while in an acid and substantially anhydrous condition, the viscosity of the solution increases without any appreciable decrease in its compatibility with hydrocarbons.

The viscosity of a butanol solution can be increased in accordance with the present invention without decreasing its compatibility with hydrocarbons, by maintaining the ratio of formaldehyde-urea reaction product to butanol high enough so that the solution contains not less than about .3 part of nitrogen derived from urea for every 2 parts of butanol and formaldehyde-urea reaction product, while the solution is in an acid and substantially anhydrous condition, until a substantial increase in viscosity has taken place. Where parts are mentioned herein, the parts are by weight.

A solution of this concentration is not very suitable for shipment, because at ordinary temperatures it has the consistency of commercial asphalt. Such a solution could be removed from the shipping container only by chopping it out, or by warping it to a temperature at which it is thin enough to be poured. Preferably, the solution is not shipped at this concentration, but is diluted, after the present process has been carried out, to a concentration of about 50 per cent solids in order to make it thin enough to be pourable at ordinary temperatures. It is also necessary to dilute the solution with additional butanol, if it is desired to arrest the increase in viscosity.

The term "butanol solution of a formaldehyde-urea reaction product" is used herein to denote a solution in which the solvent consists substantially of a butyl alcohol. A hydrocarbon is not a solvent for the formaldehyde-urea reaction product, but is a mere diluent which cannot be added without causing precipitation unless a substantial quantity of butanol is present to act as the solvent. The presence of a hydrocarbon thinner in the solution does not prevent the process from being carried out. In contrast, an alcohol such as n-pentanol is a solvent for the formaldehyde-urea reaction product, and the presence of a substantial amount of n-pentanol in the solution may prevent the increase in viscosity from taking place.

The formaldehyde-urea reaction product in a solution that is treated in accordance with the invention may be any reaction product which is soluble in butanol, and which will not split off any appreciable quantity of water while the process is being carried out. The formaldehyde-urea reaction product may be butylated, i. e., it may be in chemical combination with part of the butanol present.

The ratio of formaldehyde-urea reaction product to butanol in the solution should be high enough so that the solution contains not less than about .3 part of nitrogen derived from urea for every 2 parts of butanol and formaldehyde-urea reaction product, i. e., in a sample in which the weight of butanol and the weight of formaldehyde-urea reaction product together total 2 parts, a nitrogen analysis should show not less than about .3 part by weight of nitrogen. The nitrogen referred to is only the nitrogen derived from the urea residues in the formaldehyde-urea reaction product. Thus if another nitrogen-containing compound such as cellulose nitrate is present, it should be removed before the nitrogen analysis is carried out, or the nitrogen present in such compound should be deducted from the total nitrogen found, in order to determine the nitrogen derived from urea.

The acidity of a solution that is treated in accordance with the invention may vary, but is preferably similar to that of the solutions of formaldehyde-urea reaction products in n-butanol and hydrocarbon that are now in commercial use. It is well known that such solutions are made as acid as it is possible to make them without rendering them unstable in storage, in order that hardening may take place as rapidly as possible when the solutions are applied and baked.

The term "substantially anhydrous" is used herein to denote a solution having a water content as low as that found in the solutions of formaldehyde-urea reaction products in n-butanol and hydrocarbon that are now in commercial use. For example, the water content of a solution treated in accordance with the invention may be about 1 per cent. The water content of the solutions in commercial use is kept low in order to provide suitably high compatibility with hydrocarbons. In the present method, the water content must be kept low in order to permit the viscosity to be increased without a corresponding decrease in the compatibility of the solution with hydrocarbons.

The speed with which the viscosity is increased in carrying out the invention depends upon the concentration of butanol, the acidity of the solution and the temperature of the solution. If the present method is carried out at a given temperature, the rate of increase in the viscosity of the solution is greater when the acidity of the solution is greater, or when the concentration of butanol is less.

Moreover, the rate of increase in viscosity can be regulated by controlling the temperature. Thus an increase in the viscosity of a given solution that takes 1 hour at 110° C. may take 24 hours or longer at 60° C., or several weeks at room temperatures.

The solution may be kept at any desired temperature while the present method is carried out. However, temperatures from about 100° to about 110° C. are preferred, because the increase in viscosity at such temperatures is just slow enough to make the process easily controllable in the ordinary "batch" method of operation. A higher temperature, such as 120° C., can be used if the process is carried out by a "continuous" method of operation in which the solution is heated to the operating temperature for a very short time as it flows through a pipe, and is then quickly cooled. At still higher temperatures the increase in viscosity is too rapid to be conveniently controllable.

A solution can be rendered as viscous as desired by carrying out the present method. Of course the increase in viscosity should not be carried so far that the solution is completely solidified or hardened.

Example 1

100 parts of dimethylol urea, 300 parts of methanol and ½ part of maleic acid are heated to 50° C., and agitated until a solution is formed. After the addition of 200 parts of isobutyl alcohol, the solution is vacuum evaporated at temperatures below 85° C. to a concentration of 73 per cent solids. The resulting solution is then heated to about 100° C. and held at that temperature until the desired viscosity has been attained (a substantial increase in viscosity occurs in 1 or 2 hours without any appreciable decrease in the compatibility of the solution with hydrocarbons).

In the foregoing example, the proper acidity may be obtained by using an acid substance other than maleic acid, but most inorganic acids are so strong that it is difficult to measure out the proper quantity, and organic acids such as maleic, oxalic or phthalic are preferred.

Example 2

Any commercial solution (about 50 per cent solids) of a formaldehyde-urea reaction product in n-butanol and a volatile hydrocarbon, such as petroleum naphtha, containing about ½ per cent of water and having an acidity equivalent to about ½ per cent of maleic acid is vacuum distilled at a temperature below 85° C., to remove the hydrocarbon and increase the concentration of the solution to about 70 per cent solids. The resulting solution is then held at 110° C. for 1 hour, to produce a substantial increase in viscosity, and the solvents that were removed by distillation are returned to the solution in order to restore its original concentration and solvent content.

Various embodiments of the invention may be devised to meet various requirements.

Having described our invention, we claim:

1. A method of increasing the viscosity of a butyl alcohol solution of a formaldehyde-urea reaction product without decreasing its compatibility with hydrocarbons that comprises maintaining the ratio of formaldehyde-urea reaction product to butyl alcohol high enough, in an alcoholic solution in which the alcoholic solvent consists substantially of a butyl alcohol in a proportion sufficient to hold the formaldehyde-urea reaction product in solution, so that the solution contains not less than .3 part of nitrogen derived from urea for every two parts of butyl alcohol and formaldehyde-urea reaction product, while the solution is in an acid and substantially anhydrous condition, until a substantial increase in viscosity has taken place.

2. A method of increasing the viscosity of a butyl alcohol solution of a formaldehyde-urea reaction product without decreasing its compatibility with hydrocarbons that comprises maintaining the ratio of formaldehyde-urea reaction product to butyl alcohol high enough, in an alcoholic solution in which the alcoholic solvent consists substantially of a butyl alcohol in a proportion sufficient to hold the formaldehyde-urea reaction product in solution, so that the solution contains not less than .3 part of nitrogen derived from urea for every two parts of butyl alcohol and formaldehyde-urea reaction product, while the solution is in an acid and substantially anhydrous condition, until a substantial increase in viscosity has taken place, and then arresting the increase in viscosity by adding a butyl alcohol.

3. A method of increasing the viscosity of a butyl alcohol solution of a formaldehyde-urea reaction product without decreasing its compatibility with hydrocarbons that comprises maintaining the ratio of formaldehyde-urea reaction product to butyl alcohol high enough, in an alcoholic solution in which the alcoholic solvent consists substantially of a butyl alochol in a proportion sufficient to hold the formaldehyde-urea reaction product in solution, so that the solution contains not less than .3 part of nitrogen derived from urea for every two parts of butyl alcohol and formaldehyde-urea reaction product, while the solution is in an acid and substantially anhydrous condition and at temperatures from about 100° to about 110° C., until a substantial increase in viscosity has taken place, and then arresting the increase in viscosity by adding a butyl alcohol.

JOHN A. MURRAY.
GEORGE H. METZGER.